United States Patent [19]

Juang

[11] Patent Number: 5,663,709
[45] Date of Patent: Sep. 2, 1997

[54] AUXILIARY CONTROL CIRCUIT FOR VEHICLE LIGHTS WITH A THEFT PREVENTION FUNCTION

[76] Inventor: Ing-Bin Juang, No. 6, Lane 12, Chung Kuang Road, Tso Ying District, Kaohsiung, Taiwan

[21] Appl. No.: 640,683

[22] Filed: May 1, 1996

[51] Int. Cl.⁶ .................................................. B60Q 1/26
[52] U.S. Cl. ..................... 340/468; 340/426; 340/428; 307/10.8
[58] Field of Search ....................... 340/428, 426, 340/468, 479, 475, 474; 307/10.8

[56] References Cited

U.S. PATENT DOCUMENTS

| | | | |
|---|---|---|---|
| 4,354,174 | 10/1982 | Heidman, Jr. | 340/428 |
| 4,843,370 | 6/1989 | Milde, Jr. | 307/10.8 |
| 4,958,084 | 9/1990 | Carlo et al. | 340/428 |
| 5,323,140 | 6/1994 | Boyles | 340/428 |
| 5,353,007 | 10/1994 | Gullotti | 340/468 |
| 5,382,948 | 1/1995 | Richmond | 340/426 |

*Primary Examiner*—Jeffery Hofsass
*Assistant Examiner*—John Tweel, Jr.
*Attorney, Agent, or Firm*—Morton J. Rosenberg; David I. Klein

[57] ABSTRACT

The present invention relates to an auxiliary control circuit for vehicle lights with a theft prevention function. The control circuit comprises a transmitter, a receiver, a CPU, an acoustic pickup, and actuating circuits. The CPU receives signals from loads such as hazard lights, brake lights, door locks and enters into preset functions such as a theft prevention function, a brake warning function, and a hazard light warning function.

6 Claims, 4 Drawing Sheets

| functional button of the transmitter | output ends of the receiver | | | function |
|---|---|---|---|---|
| | V T | 1 | 0 | |
| A | 1 | 0 | 1 | theft prevention function |
| B | 1 | 0 | 0 | canceling theft prevention function |
| C | 1 | 1 | 1 | 1. vehicle identification ction under theft prevention function<br><br>2. robbery preventing function if not under theft prevention function |
| D | 1 | 1 | 0 | 1. brake warning function if pushed one time<br><br>2. hazard warning function if pushed two time<br><br>3. canceling all functions if pushed three times |

AUXILIARY CONTROL CIRCUIT FOR VEHICLE LIGHTS WITH A THEFT PREVENTION FUNCTION

BACKGROUND OF THE INVENTION

The auxiliary control circuit with theft prevention function of the present invention is developed such that functions of brake warning, hazard warning, theft prevention, etc. are provided by means of such elements as a transmitter, a receiver, a CPU, etc.

PRIOR ART

A U.S. Patent Application relating to a control circuit for vehicle taillights was filed by the instant inventor on Apr. 24, 1990, and U.S. Pat. No. 5,028,908 was granted on Jul. 2, 1991. The prior art system, as shown in FIG. 3, provided the functions of making the brake lights and turn signals flash in an alternating fashion when the brake is applied and the turn signal switch is not actuated. The prior art control circuit for vehicle taillights makes the warning effect of the lights better, however, through use, it was found to have disadvantages as follows:

1. The prior art circuit is connected with the load circuit in series, and thus, will cause the taillights and signal lights to not emit light when it breaks;
2. When accelerating the vehicle, the voltage of the power source fluctuates, and n turn that fluctuation influences the oscillation portion of the circuit, causing a change in the flickering speed of the lights;
3. The brake warning function can't be cancelled after it is set up, for lack of a cancelling function;
4. The first Darlington driver 14 and the second Darlington driver 123 will reduce the voltage supplied to the load, causing light emitted from the lights of a motorcycle to be undesirably obscured.

SUMMARY OF THE INVENTION

Art auxiliary control circuit for vehicle lights with a theft prevention function is provided. This invention comprises a transmitter, a receiver, a central processing unit (CPU), an acoustic pickup and actuating circuits.

The transmitter is carried by the vehicle driver. There are provided functional buttons A–D on the transmitter. The receiver receives signals from the transmitter. The received signals are immediately translated and relayed from outputs of the receiver to inputs of the CPU.

When the CPU receives the translated signals from the receiver, the CPU may put the auxiliary control circuit into preset functions, which include a theft prevention function, a vehicle identification function, a robbery prevention function, a brake warning function, and a hazard warning function. Then, the CPU may, at any time, receive input signals from the loads and the acoustic pickup, the loads including signal lights, brake switch, handbrake, switch, hood control button, etc. The signals input to the CPU are immediately processed and relayed from the appropriate output to actuating circuits for activation thereof in order to control loads such as signal lights, brake lights, door locks, engines, and alarms.

The functional button A is pushed for theft prevention. If the vehicle is being hit, or the hood or door is opened, the CPU will receive the message and accordingly activate the actuating circuit for the flickering of the signal lights, opening the engine circuit, preventing the engine from being started, and for sounding the alarm.

The button B is pushed for canceling the theft prevention function.

After A is pushed, the button C is pushed to enter into the vehicle identification function. Once C is pushed, the signal lights blink, the engine circuit is opened, and the alarm sounds. Thus, the vehicle owner dan identify the vehicle among many others.

After B is pushed, C is pushed to enter into the robbery prevention function. The CPU will activate the actuating circuits after a delay, preferably thirty seconds later, then causing the signal lights to blink, the opening of the engine circuit, and the sounding of the alarm.

When the vehicle owner is being robbed of the vehicle and money, he may use this function, after being forced out of the vehicle, to prevent its loss by causing the engine to stop and the sounding of the alarm.

The button D is pushed to enter into the brake warning function. Thus when th brake is applied, the signal lights, of yellow color, and the brake light, of red color, will flash repeatedly in an alternating fashion, so that the warning effect is enhanced.

If the button D is pushed for a second time, the system will enter into the hazard warning function. Under this function, the yellow left and right signal lights blink synchronously as a visual warning.

BRIEF DESCRIPTION OF THE DRAWINGS

The invention will be better understood by reference to the accompanying drawings, wherein:

FIG. 2 is a table of the functional buttons of the transmitter and the corresponding signals of the receiver and functions according to this invention; and, FIG. 3 is a circuit diagram of a prior art system, as disclosed in U.S. Pat. No. 5,028,908.

DESCRIPTION OF PREFERRED EMBODIMENTS

Figure 1:
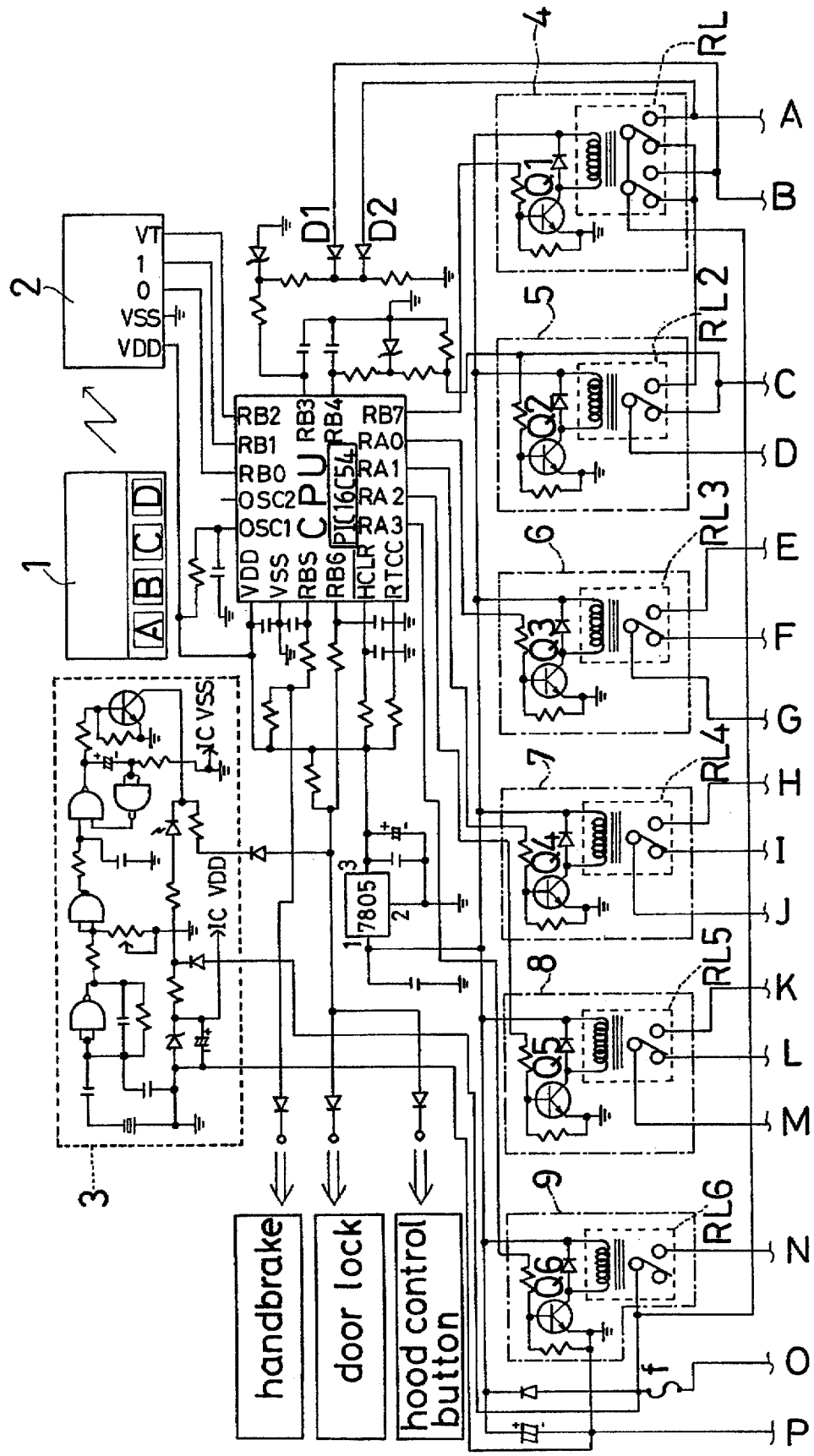
FIGS. 1 and 1A is a circuit diagram according to the present invention.

An auxiliary control circuit for vehicle lights with a theft prevention function is provided. First, referring to FIGS. 1 and 1A, this invention comprises a transmitter 1, a receiver 2, a central processing unit numbers as PIC 16C54, an acoustic pickup 3 and actuating circuits 4–9.

The transmitter 1 is carried by the vehicle driver. There are provided functional buttons A–D for the transmitter 1. Signals from the functional buttons A–D are coded by a coder before being transmitted.

The receiver 2 receives the signals from the transmitter 1. The received signals are immediately translated by a code translator. The translated signals are turned into preset signals which are then relayed from outputs VT, 1, and 0 of the receiver 2 to inputs RB2, RB1, RB0 of the CPU.

When the CPU receives the translated signals from the receiver 2, using prestored programs, the CPU causes the system to enter into one of several preset functions, as shown in FIG. 2. Then, the CPU may, at any time, receive input signals from the loads and the pickup 3 through inputs RB3–RB6 thereof, the loads including signal lights, brake switch, handbrake switch, hood control button, etc. The input signals are immediately processed and relayed from appropriate outputs RB7, RA0–RA3 to the respective actuating circuits 4–9 for activation thereof, in order to control such loads as signal lights, brake lights, door locks, the engine, and alarms.

The acoustic pickup 3 is secured on an appropriate location of the vehicle. The acoustic pickup 3 can sense sound produced when the vehicle is being broken into, and will accordingly notice the CPU by sending a message to the input RB6 of the CPU.

The actuating circuit 4 is formed by connecting a transistor Q1 to a relay RL1, the actuating circuit S is formed by connecting a transistor Q2 to a relay RL2, and so on.

The transistor Q1 of the actuating circuit 4 is activated by the output RB7 of the CPU. The relay RL1 has two synchronously operated switches with two normally open (NO) contacts respectively connected to left and right signal lights. The left and right signal lights are further connected with the input FB3 of the CPU,. by means of forward diodes D1, D2. The two common terminals (COM) of the relay RL1 are connected to a power source, e.g. a battery. The relay RL1 of the actuating circuit 5 has a NO connected to the normally closed (NC) contacts of the relay RL1. The relay RL2 has a COM contact connected to the brake lights. The relay RL2 has a NC contact connected to the brake switch, the transistor Q2, and the input RB4 of the CPU. The actuating circuits 6–9 are connected to outputs RA0–RA3, respectively, so that the actuating circuits 6–9 can he activated. The relays RL3 and RL4 are respectively connected to the door locks for unlocking and locking the doors. The relays RL5 and RL6 are respectively connected to the engine circuit for opening the circuit and the alarm, for starting such.

The battery is connected with a voltage stabilizer and a fuse f, in series, before it is connected to the auxiliary control circuit. The auxiliary control circuit is connected in parallel with the loads so that the loads, such as the brake light and the signal lights, can still function if the fuse f is open. The voltage stabilizer prevents fluctuation of the power source voltage when the vehicle is accelerated, which fluctuation can cause some circuits to not work properly.

Figure 1A:
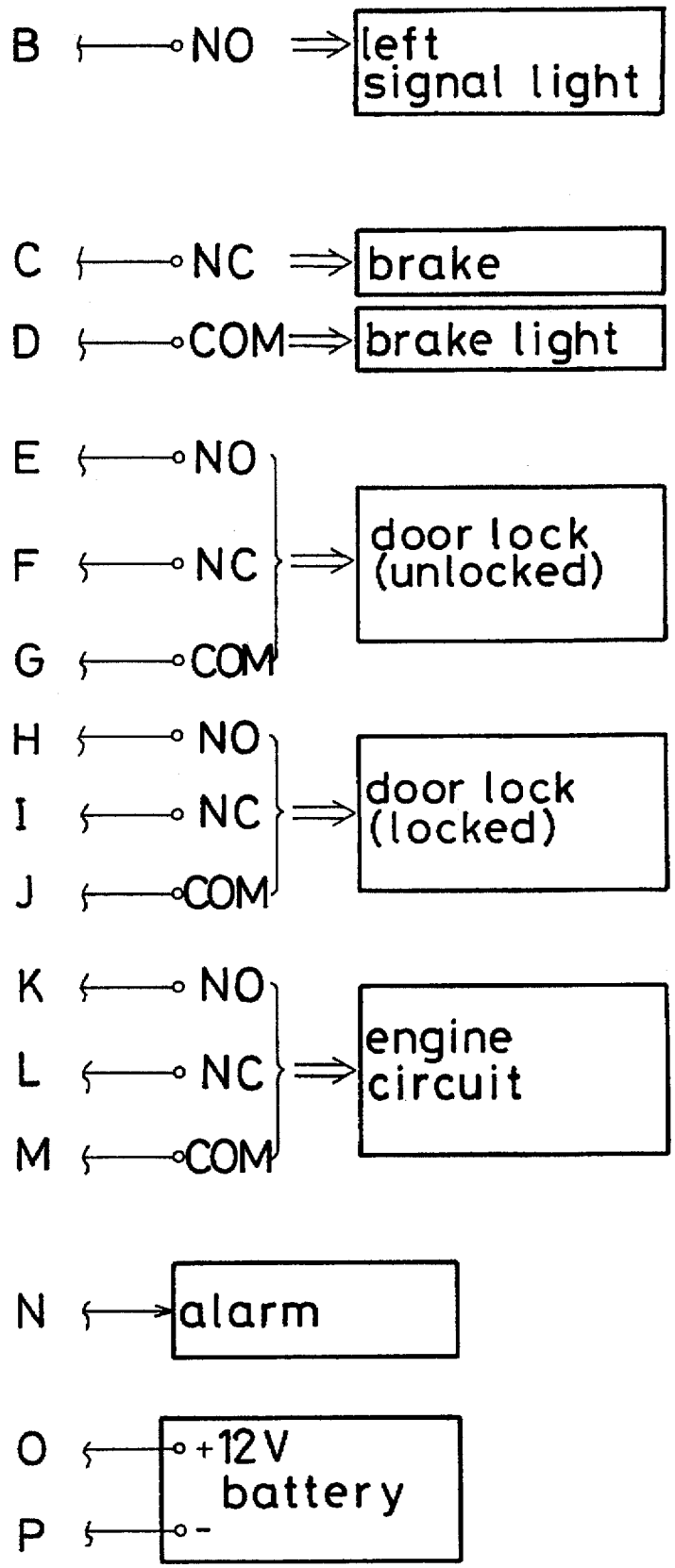
Figure 3:
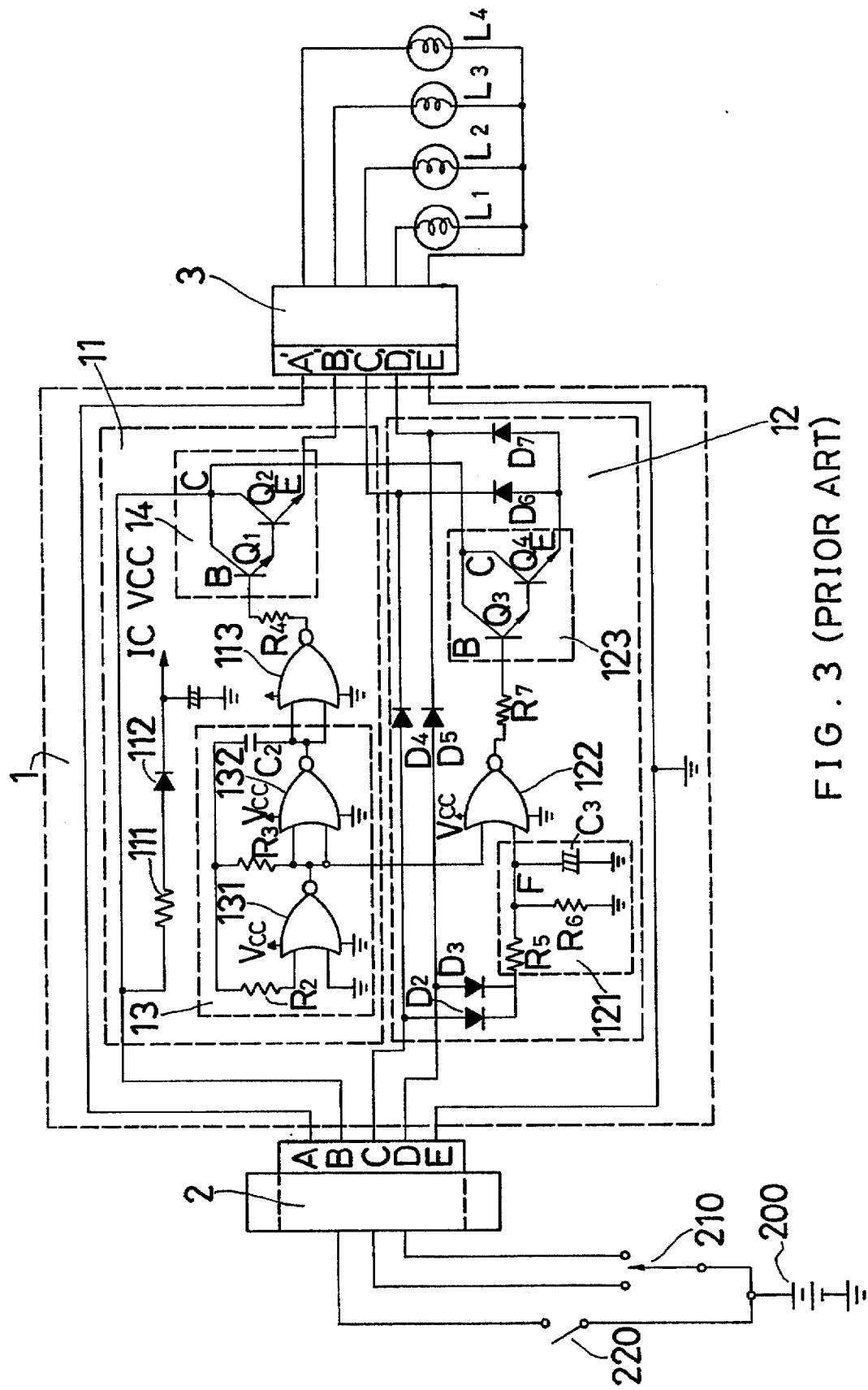

Referring further to FIGS. 1, 1A and 2, in operation, the functional buttons A–D of the transmitter 1 are used for controlling this invention. The operation is demonstrated as follows.

The functional button A is pushed for theft prevention. Meanwhile, the CPU activates the actuating circuits 4, 7, 9 for one flash of the signal lights, for locking the door locks, and for respectively sounding the alarm one time. The CPU is at the same time ready to receive signals sent from loads, such as the acoustic pickup 3, the vehicle door, the hood control button, etc. If the vehicle is being hit, or the hood or door is opened, the CPU will receive a message to that effect and accordingly activate the actuating circuits 4, 8, and 9, for the flashing of the signal lights, preferably for fifteen seconds, for opening of the engine circuit so that the engine will not start, and for sounding the alarm preferably for fifteen seconds.

The button B is pushed for canceling the theft prevention function. Once B is pushed, the CPU will activate the actuating circuits 4, 6, 8, 9 for two flashes of the signal lights, for unlocking the door locks, for closing of the engine circuit so that the engine will be startable, and for sounding the alarm twice. However, if the door is not opened after a period of time, i.e., ten seconds, the CPU will decide that it is a false touch of the button B and go hack into the theft prevention function again, automatically.

After A is pushed, C is pushed to enter into the vehicle identification function. Once C is pushed, the CPU will activate the actuating circuits 4, 8, and 9 for the hazard lights to blink, for opening of the engine circuit, and for sounding the alarm, respectively. Thus, the vehicle owner can identify the vehicle among many others.

After B is pushed, C is pushed to enter into the robber prevention function. The CPU will immediately activate the actuating circuit 4 for the signal lights to blink, preferably two times. The CPU will also activate the actuating circuits 4, 8, and 9 after a delay, preferably thirty seconds later, for the signal lights to blink, for opening of the engine circuit, and for sounding the alarm. In this way, when the vehicle owner is being robbed of the vehicle and money, he may use this function after having been forced out of the vehicle, to prevent loss of the vehicle by causing the engine to stop and alarm to sound. The owner knows that this function is set up, seeing the signal lights blink.

The button D is pushed to enter into the brake warning function. Once D is pushed, the inputs RB3 and RB4 of the CPU are ready to receive signals sent from the signal lights and the brake light, respectively. When the brake is applied, the current will flow through the brake to activate the actuating circuit 5 to shift the relay RL2 so that COM and NO contacts of the relay RL2 will be connected with the NC and COM contacts of the relay RL1 to energize the brake light. Meanwhile, the current also passes through the brake switch to the input RB4 of the CPU. The CPU will send an oscillatory signal through the output RB7 thereof to intermittently activate the actuating circuit 4, so that NO and NC contacts of the relay RL1 are alternately connected to the COM contact, repeatedly. When the NO contact of the relay RL1 is connected to the COM contact, the current will energize the signal lights. When the NC contact of RL1 is connected to the COM contact, the current will energize the brake light. Thus when the brake is applied, the signal lights, of yellow color, and the brake light, of red color, will repeatedly flash aternatingly so that the warning effect is enhanced.

When the output RB7 of the CPU is at low potential, the CPU will keep checking the input RB3 to see whether the signal lights are turned on. When RB7 is at high potential, the CPU will not check input RB3 If the input RB3 is at low potential, the output RB7 will keep sending out an oscillatory signal. When input RB3 is at high potential, the CPU will set the output RB7 to a low potential. Generally, the power source signal of a common car signal lights is an impulse wave having a period of 0.5–1.5 seconds. If it takes more than 1.5 seconds for the input RB3 to be changed from a high potential to a low potential and RB3 does not receive input of a high potential, the CPU will conclude that there won't be a signal light signal, and will make the output RB7 an oscillatory signal. If a signal light is turned on and meanwhile the brake is applied, the signal light will blink normally as controlled by the vehicle's own circuit, and the brake power source will activate the actuating circuit 5 to connect the NO contact to the COM contact of the relay RL2, to energize the brake light. Thus, when the signal light is turned on and the brake is applied, the signal light and the brake light will function as usual.

If the button D is pushed for the second time, the auxiliary control circuit will enter into a hazard warning function. Under this function, the CPU will send out oscillatory signals from the output RB7 to intermittently activate the actuating circuit 4, causing the NO contacts of the relay RL1 to be connected intermittently to the COM contact. Thus, the left and right signal lights will blink synchronously as a warning.

Furthermore, the CPU continues checking the input RB3 to see whether the turn signal switch is turned on, the method being the same as the above described. If the hazard warning function is in operation and meanwhile, the turn signal switch is turned on, the CPU will detect the signal of the turned on turn signal switch, and make the output RB7 a low potential. Thus, the turn signal will function under control of the vehicle's own circuit, to indicate the turning direction.

Generally speaking, the driver, driving in the rain, would start the hazard warning function for warning others. However, the synchronously blinking signal lights are not capable of indicating the turning direction if the driver wants to turn. With prior art systems, the driver has to turn off the synchronously blinking signal lights before he can start either turn signal to signal a direction he intends to turn. With the above described auxiliary control circuit, the driver doesn't have to cancel the hazard warning function before he initiates either turn signal light to signal the direction of an intended turn. That is to say, when either turn signal light is turned on, the synchronously blinking blinkers can be immediately turned off by the auxiliary control circuit of the instant invention.

When the button D is pushed for the third time, all the warning functions are canceled.

Furthermore, when the handbrake is released, the input RB5 of the CPU will change from a low potential to a high potential, and the CPU will activate the actuating circuit 7 to lock the door locks. On the other hand, when the handbrake is engaged after parking the car, the input RB5 of the CPU will change from a high potential to a low potential so that the CPU can activate the actuating circuit 6 to unlock the door locks.

From the above description, this invention can be known to have the following advantages that are absent from the system of U.S. Pat. No. 5,028,908.

1. Because the auxiliary control circuit is connected in parallel with the loads, the loads such as the brake light and the signal lights can remain under control of the vehicle's own circuit when the fuse has opened.

2. The voltage stabilizer is connected in series with the auxiliary control circuit to stabilize the power source thereto.

3. The transmitter and receiver are provided so that the various functions provided by the auxiliary control circuit can be canceled, stopped, and changed from one to another.

4. The actuating circuits are comprised of transistors and relays, connected together, to minimize voltage drops.

5. The CPU provides the hazard warning function, and the theft prevention function.

6. The synchronous blinking of the signal lights under the hazard warning function will turn off as soon as either signal light is controlled to signal the turning direction of the vehicle.

7. The handbrake can be used to control the locking and unlocking of the door locks. The door locks are locked when the handbrake is released, so the danger of forgetting to lock the doors when driving is prevented.

8. While the preferred embodiments of the invention have been described above, it will be recognized and understood that various modifications may be made therein and the appended claims are intended to cover all such modifications which may fall within the spirit and scope of the invention.

What is claimed is:

1. An auxiliary control circuit for vehicle lights with a theft prevention function, comprising:
   a transmitter adapted to be carried by a user for transmitting any one of a plurality of coded signals;
   a receiver disposed within a vehicle for receiving said coded signals from said transmitter and providing a digital output signal responsive thereto;
   a central processing unit having a first input coupled to said receiver for input of said digital output signal thereto, said central processing unit having a second input coupled to a brake switch of the vehicle for monitoring operation thereof and a third input coupled to a pair of signal lights of the vehicle for monitoring operation of the vehicle's turn signal switch, said central processing unit having a plurality of outputs; and,
   a plurality of actuating circuits respectively coupled to said plurality of outputs of said central processing unit, a first of said plurality of actuating circuits including a first relay having a pair of common contacts coupled to a power source of the vehicle and a pair of normally open contacts respectively coupled to the pair of vehicle signal lights and a first transistor drivingly coupled to said first relay and having an input coupled to a first of said plurality of outputs of said central processing unit, a second of said plurality of actuating circuits including a second relay having (1) a common contact coupled to a brake light of the vehicle, (2) a normally closed contact coupled to the brake switch of the vehicle, and (3) a normally open contact coupled to both of a pair of normally closed contacts of said first relay, said second actuating circuit including a second transistor drivingly coupled to said second relay and having an input coupled to the brake switch of the vehicle, said central processing unit including:
   (a) means for activating a brake warning function responsive to a first predetermined coded signal from said transmitter, said brake warning means providing an intermittent drive signal to said first output of said central processing unit to alternatingly flash the vehicle's brake light and pair of signal lights, said brake warning means inhibiting said intermittent drive signal responsive to an input signal at said third input of said central processing unit indicating operation of the vehicle's turn signal switch, said brake warning means inhibiting said intermittent drive signal responsive to a second predetermined coded signal from said transmitter; and,
   (b) means for actuating a hazard warning function responsive to a third predetermined coded signal from said transmitter, said hazard warning means providing an intermittent drive signal to said first output of said central processing unit to flash the pair of signal lights of the vehicle, said brake warning means inhibiting said intermittent drive signal responsive to an input signal at said third input of said central processing unit indicating operation of the vehicle's turn signal switch, said hazard warning means inhibiting said intermittent drive signal responsive to said second predetermined coded signal from said transmitter.

2. The auxiliary control circuit as recited in claim 1 further comprising a voltage stabilizer circuit having an input coupled to the vehicle's power source and an output coupled to a power input of said central processing unit.

3. The auxiliary control circuit as recited in claim 1 further comprising an acoustic pickup coupled to a fourth input of said central processing unit, said fourth input being further coupled to both the vehicle's door locks and a hood control switch of the vehicle, said central processing unit including a fifth input coupled to a handbrake switch of the vehicle, a third of said plurality of actuating circuits including (1) a third relay coupled to the door locks of the vehicle, and (2) a third transistor drivingly coupled to said third relay and having an input coupled to a second of said plurality of outputs of said central processing unit for unlocking the vehicle's doors responsive to a signal from said second output of said central processing unit, a fourth of said plurality of actuating circuits including (1) a fourth relay coupled to the door locks of the vehicle, and (2) a fourth transistor drivingly coupled to said fourth relay and having an input coupled to a third of said plurality of outputs of said central processing unit for locking the vehicle's doors responsive to a signal from said third output of said central processing unit, a fifth of said plurality of actuating circuits including (1) a fifth relay coupled to engine circuit of the vehicle, and (2) a fifth transistor drivingly coupled to said fifth relay and having an input coupled to a fourth of said plurality of outputs of said central processing unit for preventing operation of the vehicle's engine responsive to a signal from said fourth output of said central processing unit, a sixth of said plurality of actuating circuits including a sixth relay having a common contact coupled to the vehicle's power source and a normally open contact coupled to an alarm and a sixth transistor drivingly coupled to said sixth relay and having an input coupled to a fifth of said plurality of outputs of said central processing unit for activating said alarm responsive to a signal from said fifth output of said central processing unit.

4. The auxiliary control circuit as recited in claim 3 where said central processing unit includes means for actuating a theft prevention function responsive to a fourth predetermined coded signal from said transmitter, said theft prevention means providing output signals on said first, third and fifth outputs of said central processing unit to (1) flash the pair of signal lights of the vehicle a single time, (2) lock the vehicle's doors, and (3) sounding said alarm a single time, said theft prevention means providing output signals on said first, fourth and fifth outputs of said central processing unit to (1) flash the pair of signal lights of the vehicle, (2) preventing operation of the vehicle's engine, and (3) sounding said alarm responsive to an input signal received at either of said fourth and fifth inputs of said central processing unit, said theft prevention means providing output signals on said first, second and fifth outputs of said central processing unit to (1) flash the pair of signal lights of the vehicle twice, (2) lock the vehicle's doors, and (3) sounding said alarm twice responsive to said second predetermined coded signal from said transmitter.

5. The auxiliary control circuit as recited in claim 4 where said central processing unit includes means for actuating a vehicle identification function responsive to a fifth predetermined coded signal from said transmitter, said theft prevention means providing output signals on said first, fourth and fifth outputs of said central processing unit to (1) flash the pair of signal lights of the vehicle, (2) preventing operation of the vehicle's engine, and (3) sounding said alarm to aid a user in identifying the vehicle from a plurality of others.

6. The auxiliary control circuit as recited in claim 4 where said central processing unit includes means for locking the vehicle's doors responsive to release of the vehicle's handbrake and unlocking the vehicle's doors responsive to application of the vehicle's handbrake, said door locking means providing an output signal on said second output of said central processing unit responsive to a change in an input signal at said fifth input of said central processing unit from a low potential to a high potential, said door locking means providing an output signal on said third output of said central processing unit responsive to said change in said input signal at said fifth input of said central processing unit changing from a high potential to a low potential.

* * * * *